UNITED STATES PATENT OFFICE.

HENRY FREI, OF KANSAS, ILLINOIS.

ROOFING-CEMENT.

SPECIFICATION forming part of Letters Patent No. 364,405, dated June 7, 1887.

Application filed November 2, 1886. Serial No. 217,815. (No specimens.)

*To all whom it may concern:*

Be it known that I, HENRY FREI, of Kansas, in the county of Edgar and State of Illinois, have invented a new and useful Improvement in Roofing-Cements, of which the following is a full, clear, and exact description.

This invention has for its object the production of a cheap, efficient, and durable water-proof cement for tin, iron, and other metal roofs.

My composition consists of the following ingredients, combined in about the proportions stated, viz: lead pigment, (white or red lead,) three-fourths (¾) of a pound; plaster-of-paris, one-fourth (¼) of a pound, and linseed-oil in sufficient quantity to make the whole mass plastic.

I first mix well together the white or red lead (lead pigment) and plaster-of-paris, and then add a sufficient quantity of the linseed-oil, and stir, to make the whole mass neither too thin nor too thick, but moderately plastic, so that the composition thus produced can be readily applied in a soft state, by a flat board or other suitable means, to the cracks or breaks in a tin or rusted iron roof.

This roofing-cement is proof against cracking, both when exposed to the frosts of winter and heats of summer, and is water-proof and exceedingly durable, besides being comparatively inexpensive. It will effectually exclude the hardest of rains upon a roof.

If desired, the plaster-of-paris, in or about the proportion stated, can be added to an already-mixed paint composed of the other ingredients herein specified—that is, the lead and oil.

I am aware that boiled linseed-oil, plaster-of-paris, white or colored lead, Venice turpentine, and water have been combined to form a roofing compound, and I therefore do not claim such invention.

Having thus described my invention, what I claim as new, and desire to secure by Letters Patent, is—

The herein-described roofing cement, consisting of lead, three parts; plaster-of-paris, one part, and sufficient oil to form a plastic mass, as specified.

HENRY FREI.

Witnesses:
P. P. BOYER,
W. F. BOYER.